United States Patent [19]

Laskin et al.

[11] 3,967,042

[45] June 29, 1976

[54] FUSER BLANKET

[75] Inventors: Harold B. Laskin, New Brighton; Robert H. Valentine, St. Paul, both of Minn.

[73] Assignee: Minnesota Mining and Manufacturing Company, St. Paul, Minn.

[22] Filed: Jan. 12, 1973

[21] Appl. No.: 322,915

[52] U.S. Cl. .................................. 428/422; 428/447; 428/450; 432/61; 219/216; 427/261

[51] Int. Cl.$^2$ ............................................ B32B 27/00

[58] Field of Search ............ 161/189, 206; 428/422, 428/447, 450

[56] References Cited

UNITED STATES PATENTS

| | | | |
|---|---|---|---|
| 2,833,656 | 5/1958 | Sandt | 161/189 X |
| 2,898,631 | 8/1959 | Jeffery | 18/47.5 |
| 2,932,599 | 4/1960 | Dahlgren | 161/189 X |
| 3,051,677 | 8/1962 | Rexford | 204/159.17 X |
| 3,146,799 | 9/1964 | Fekete | 161/206 X |
| 3,291,466 | 12/1966 | Aser et al. | 432/61 X |
| 3,296,063 | 1/1967 | Chandler | 161/206 X |
| 3,554,836 | 1/1971 | Steindorf | 161/413 X |
| 3,655,727 | 4/1972 | Patel et al. | 260/80.76 X |

*Primary Examiner*—Marion E. McCamish
*Assistant Examiner*—Patricia C. Ives
*Attorney, Agent, or Firm*—Alexander, Sell, Steldt & DeLahunt

[57] ABSTRACT

A composite laminate structure is provided which is suitable for use as a fuser blanket in copiers or reproducers which are based on heat fixing of images on receptor surfaces. The structure is comprised of a dimensionally stable, heat conductive substrate having bonded to one surface thereof a thin, resiliently compressible layer of a fluorinated elastomeric polymer and an outer layer bonded thereto of a thin, resiliently compressible silicone elastomer.

7 Claims, 2 Drawing Figures

FUSER BLANKET

BACKGROUND OF THE INVENTION

This invention relates to the field of duplication wherein heat fixing systems for fixing images on powdered thermoplastic marking media to receptor surfaces, e.g. in high speed automatic copiers or reproducers, are utilized. More particularly it relates to an improved fusing blanket construction for use in such fixing systems.

The use of thermoplastic resin material in particulate form for the purpose of forming images on paper in copying machines or the like has generated various devices for adhering the particulate material to the desired receptor surfaces, especially in the form of sheets. It is necessary that the particulate resin material, hereinafter referred to as ink or toner powder, be fused or softened to a tacky state such that it can adhere to the receptor surface, and upon cooling will be bonded to the receptor surface to form images thereon. It is important in fixing the ink to the receptor surface that the ink is not disturbed as far as location on the receptor surface and that the ink is not offset so as to distort the image character.

Fusing devices which have been utilized for this image fixing generally include a pair of nip rolls, one being a heated fusing roller having a peripheral surface which has a low affinity for the fused or softened ink, and the other being a pressure or backup roll. The receptor element, generally a sheet of paper, bearing the particulate ink advances between the nip area of the rollers whereby the ink is to be fused and bonded to the receptor surface. The peripheral surface of the fusing roller must have a sufficiently low affinity for the softened ink such that the tacky ink particles preferentially adhere to the receptor surface rather than the fuser roll surface. If these particles do stick to the fuser roll surface, a splitting of the image occurs, such that a partial or ghost image results on the next advancing sheet, producing what is commonly termed in the duplicating art an offset image.

One approach to providing a surface for the fusing roller which has a low affinity for the softened ink is by using nip rolls which may be coated with a tetrafluoroethylene resin such as Teflon and a system for dispensing a silicone oil (a dimethyl siloxane polymer) onto the heated fusing roll, as taught by U.S. Pat. Nos. 3,291,466; 3,331,592; 3,449,548; and 3,452,181.

Another method, designed to eliminate problems encountered with liquid dispensing systems, is to provide a silicone elastomer surface for the heated fusing roll, as is taught in U.S. Pat. No. 3,669,707. However, the silicone elastomer surface is subject to abrasion and chemical interaction with the ink particles, which does cause a long-term loss in effectiveness.

A recent improved fusing device, as disclosed in copending and commonly assigned U.S. patent application, Ser. No. 103,725, filed by Gorka et al on Jan. 4, 1971, now U.S. Pat. No. 3,716,221 granted Feb. 13, 1973, utilizes a fusing blanket comprised of a thin, flexible heat-conductive substrate, such as stainless steel, having bonded thereto a silicone elastomer, which can be removably mounted on a heated fusing roll. During operation an offset preventing fluid, e.g. silicone oil, is applied to the silicone elastomer surface of the fuser blanket. The silicone elastomer surface is, however, somewhat penetrable by the offset preventing liquid. It has been found that this penetration can tend to cause a failure of the bond between the heat-conductive substrate and the silicone elastomer overlayer over a period of time, eventually resulting in delamination of the blanket.

This invention provides a fusing blanket which retains the beneficial silicone elastomer surface for offset prevention and allows utilization of a dispensed fluid such as silicone oil without any attendant delamination problem. This is accomplished by providing a fuser blanket in the form of a composite construction of a heat-conductive substrate having bonded thereto, in ascending order, a fluorinated elastomeric polymer and a silicone elastomer. While the silicone elastomer is penetrable by offset preventing fluids such as silicone oil, the fluorinated elastomer is substantially impenetrable. Also, the bond between the silicone and fluorinated elastomers is not affected by penetration of the fluid. Thus delamination of the fuser blanket is effectively prevented, resulting in a longer-lived fuser blanket.

SUMMARY OF THE INVENTION

In accordance with the invention, there is provided a composite article useful as a fuser blanket comprising a dimensionally stable heat conductive substrate having bonded to at least one surface thereof a thin, resiliently compressible layer of a fluorinated elastomeric polymer and a thin, resiliently compressible silicone elastomer outer layer bonded thereto.

The composite blanket can be conveniently utilized in high speed copier systems wherein an offset preventing fluid such as silicone oil is applied to the fusing roll because the fluid does not have a long term detrimental effect on the laminate structure, i.e. it does not promote delamination of the blanket during operation.

DETAILED DESCRIPTION OF THE INVENTION

Figure 1:
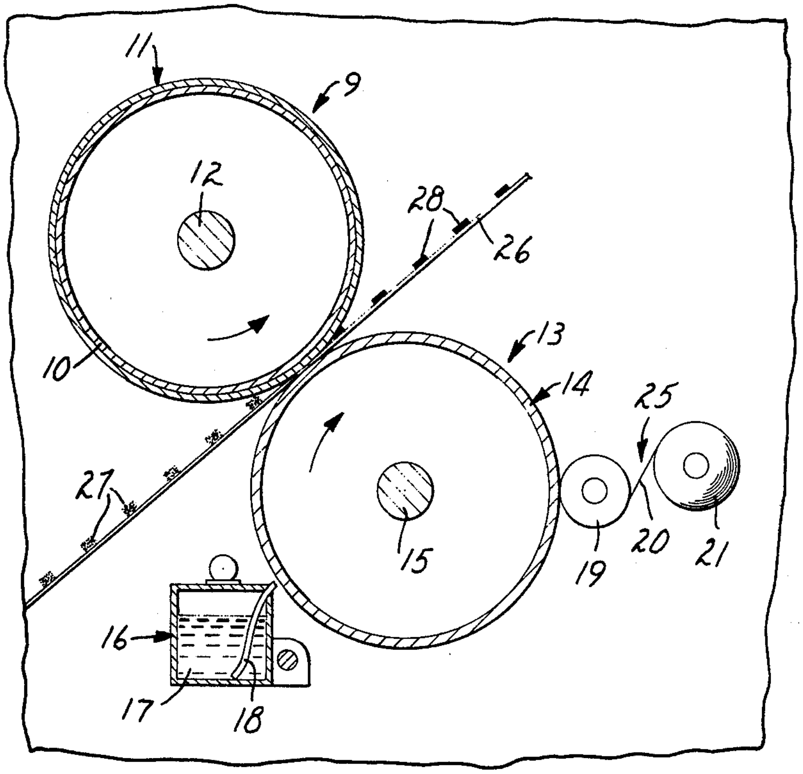
Figure 2:
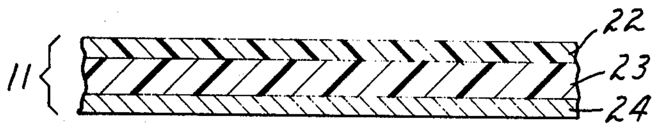

To illustrate the invention, accompanying drawings are presented wherein FIG. 1 is a simple schematic view of a fusing device wherein the fuser blanket is utilized, and FIG. 2 is a cross-section of the preferred fuser blanket.

Typically, the fuser device illustrated in FIG. 1 has a fusing roller 9, a backup roller 13, a toner offset preventing liquid applicator 16 and a backup roller cleaner 19.

The fusing roller 9 comprises a hollow drum 10 of a heat conductive material such as aluminum generally having a heat source therein (not illustrated) to provide sufficient heat to the periphery of the fusing blanket 11 covering the drum to fuse the ink 27 to the receptor sheet 26. The fused ink is shown as 28. The fusing blanket is preferably wrapped around the drum and attached thereto. The outer peripheral surface of the fusing blanket generally has about a 15 inch circumferential extent so as to permit fusing of developer to a 14 inch receptor sheet upon a single revolution of the fuser roll. The fuser roll has a shaft 12 connected thereto which can be utilized to drive the fuser roll.

Backup roller 13 comprises a hollow drum, typically of aluminum, with an exterior surface coating 14 of polytetrafluoroethylene providing a rigid peripheral surface. The backup roller has a shaft 15 connected thereto which can be used to drive the roller. Fusing pressure, i.e. the pressure required to force a receptor sheet 26 into intimate contact with fusing blanket 11, is generally applied by the backup roller by convenient means such as, for example, compression springs.

The offset preventing fluid applicator comprises a receptacle 16 in which is contained an offset preventing liquid 17. A wick 18 extends from the fluid receptacle 16 toward backup roller 13 along the length thereof for applying the fluid.

The backup roll cleaner 25 comprises a supply roll 21 of a cleaning web 20, a takeup roller 19, and a drive for transferring the cleaning web 20 from supply roll 21 to takeup roller 19. Takeup roller 19 is biased into contact with backup roller 13 by any convenient method, e.g. springs. In use a fresh portion of cleaning web is continuously presented to backup roller 13 to remove excess offset preventing fluid 17 and any toner powder or other debris accumulated thereon.

In use, the fusing roller 9 is actuated as a receptor sheet containing imaged toner powder thereon approaches the nip area between fusing roller 9 and backup roller 13 and positions the receptor sheet. Fusing pressure is applied at the nip area by the backup roller 13 and heat is applied to the fusing blanket typically by a source within the fusing drum 10, thereby fusing the toner powder to the receptor sheet. Offset preventing fluid applied to the backup roller 13 can be transferred to the periphery of the fuser blanket 11 by permitting an occasional extra rotation of the fuser roller 9 and backup roller 13 without a receptor sheet therebetween.

FIG. 2 is a cross section of the preferred fuser blanket 11 of this invention, illustrating a backing member 24 of a dimensionally stable, heat conductive material having bonded thereto a thin fluorinated elastomeric layer 23 and bonded thereover a thin silicone elastomer overlayer 22 which is the surface of the blanket contacted by the offset preventing liquid and the fusable toner powder on a receptor sheet. Preferably the dimensionally stable heat conductive substrate is a thin, flexible metallic sheet material. However, the substrate can alternatively be the surface of fusing roller 10.

For commercial high speed duplicating systems a fuser blanket must typically possess certain characteristics. First, the blanket must be resiliently compressible so as to provide an area of intimate contact with the receptor when pressure is applied at the nip via the backup roller. Second, the blanket must be capable of withstanding pressures in excess of about 100 psi at operating temperatures in excess of about 200°C. while maintaining its physical and dimensional integrity over a long period of time. Third, the blanket surface must have a low affinity for the toner powder under fusing conditions. Fourth, the blanket must be capable of withstanding continuous contact with an offset preventing fluid such as silicone oil for a long period of time under the elevated temperatures encountered during fusing.

For high speed duplicating systems wherein extended blanket life is extremely desirable, silicone elastomers may not be capable of withstanding continuous contact with an offset preventing fluid such as silicone oil for the desired long period of time. Fluorinated elastomers, conversely, are capable of withstanding long term continuous contact with such fluids, as they are substantially impenetrable to such fluids. However, fluorinated elastomers generally do not have a sufficiently low affinity for toner powder under the conditions encountered during the fusing operation. By combining silicone and fluorinate elastomers, a composite is attained wherein silicone oil or other offset preventing fluid will substantially penetrate only the silicone elastomer layer, thereby allowing the fuser blanket to retain its physical and dimensional integrity during operation under fusing conditions for a long period of time. The bond formed between the silicone and fluorinated elastomers is not deleteriously affected to any substantial extent by the fluid penetration, and the release surface thereby remains intact under copier operation conditions over the extended period of time required for high speed duplicating systems.

The backing material or substrate suitable for use in the fusing blanket must be dimensionally stable at elevated temperatures. Additionally, when fusing temperatures are attained by heating means within the fusing roller, the substrate must be heat conductive. While the surface of the fusing roller itself can be utilized as the substrate, it is preferred to utilize a separate substrate or backing material. This is because insertion of a replacement fusing blanket is simplified to a great extent. If the blanket is formed on the surface of the fusing roller, the entire roller must be replaced. Conversely, when a separate backing is utilized the blanket can be releasably attached to the fusing roller to facilitate replacement. Metallic sheet material is exemplary of suitable material possessing the aforementioned characteristics. A preferred backing is stainless steel, although materials such as aluminum, copper and brass are also satisfactory. Substrate thicknesses should be sufficient to provide strength and dimensional stability and yet be flexible enough to easily conform to the fuser roller. Generally, thicknesses in the range of about 2 mils to about 15 mils, preferably about 5 mils, are satisfactory. Decreasing thicknesses tend to provide greater flexibility, thereby facilitating conformance of the composite blanket to the fuser roller, but provide decreased strength and dimensional stability. Conversely, increasing thicknesses provide greater strength but less flexibility.

Fluorinated curable polymers useful in this invention are those which when cured to an elastomer are substantially impenetrable to offset preventing fluids such as silicone oil and which are resiliently compressible so as to provide intimate contact of the fuser blanket with a receptor surface. Additionally, the fluorinated elastomer should be heat transmissive when fusing temperatures are attained by heating means within the fusing roller. When heating means are utilized external from the fusing roller, this criteria is of course immaterial. Preferable fluorinated polymers are those containing at least about 37% by weight of carbon-bonded fluorine, and more preferably wherein at least about 50% of the non-skeletal carbon valance bonds are to fluorine. Exemplary of such polymers are fluorosilicone polymers which can be generally termed perfluoro alkyl alkylene siloxanes. These polymers contain a terminal perfluoro alkyl group which is positioned no closer than two carbon atoms from the silicon atom, and additionally contain a minor amount of substituent groups which will allow curing or crosslinking to occur. These substituent groups can for example be silicon-bonded hydrogen atoms, vinyl groups, or peroxy-activatable groups. A preferred curable fluorosilicone polymer is commercially available from the Dow Corning Co. under the tradename LS-53, which is a trifluoropropyl methyl vinyl polysiloxane.

Linear saturated fluorinated copolymers of vinylidene fluoride and fluoromonoolefins, as disclosed in U.S. Pat. No. 3,655,727 are also exemplary of suitable curable fluorinated polymers. Preferred saturated fluorinated polymers are those produced by copolymerizing perfluoropropene and vinylidene fluoride as described in U.S. Pat. Nos. 3,051,677 and 3,318,854.

The fluorinated elastomer layer should generally have a thickness sufficient to provide a resiliently compressible and, if required, heat transmissive layer, typically from about 10 mils to about 100 mils, and preferably about 30 mils.

The softness of this elastomer layer should be sufficient to provide suitable nip contact area during the fusing operation and yet maintain physical integrity. Generally, an elastomer having a Shore A durometer hardness of 20 to 80, and preferably 50 is satisfactory.

The fluorinated elastomer layer can be conveniently formed by curing the fluorinated polymers in situ at the time of manufacture of the blanket. Curing or cross linking agents for curing fluorinated polymers are generally well known in the art. For example, curing systems for vinylidene fluoride/ fluoromonoolefin elastomeric copolymers are taught in U.S. Pat. No. 3,655,727. Curing or cross linking agents for use with curable fluorosilicone polymers include dicumyl peroxide, 2,4-dichlorobenzoyl peroxide, benzoyl peroxide, di-tertiarybutyl peroxide, tertiary-butyl perbenzoate, and 2,5-dimethyl2,5 di(t-butyl peroxy) hexane. Curing conditions vary depending upon the curable fluorinated polymer and curing agent chosen, effective cures being obtained at temperatures up to about 450°F. for a period of from about 1 minute to about 15 hours, and more usually from about 5 minutes to about 30 minutes.

Silicone elastomers suitable for use in this invention are characterized and described in U.S. Pat. No. 3,554,836, granted to Steindorf on Jan. 12, 1971, incorporated herein by reference the adhesive nature of such elastomers are quantitatively characterized therein by their release values. As indicated therein, silicone elastomers customarily have release values of less than about 30 grams/inch. Furthermore, materials having release values greater than 100 grams/inch will not release thermoplastic transfer media to a receptor in nonsplitting fashion. Exemplary silicone elastomers include the cured or further polymerized product of a silicone gum, such as dimethyl vinyl polysiloxane sold under the tradename SE-33. The preferred blanket surface comprises an elastomer prepared from a mixture of the above-mentioned gum with a silicone resin such as sold under the tradename Sylgard 184, with equal parts by weight of the gum and resin being the preferred mixture. However, other proportions of these ingredients are also useful. For example, from 30 to 100 parts by weight of gum with correspondingly from 70 to 0 parts by weight of resin will produce a useful blanket surface. A cured surface composed of the silicone resin containing less than 30 percent by weight of the silicone gum may be too hard to be useful in this invention.

For the preparation of the silicone elastomer layer, curing agents such as benzoylperoxide, 2,4-dichlorobenzoyl peroxide, tertiarybutyl perbenzoate, dicumyl peroxide or the like are satisfactory. Preferably the curing agent is a mixture of low molecular weight polydimethyl siloxane containing silane groups and an initiative catalyst, such as the curing agent being sold under the tradename "Sylgard 184 Curing Agent." Curing conditions required by these agents vary depending upon the curing agent and the silicone gums or resins, effective cures being obtained at temperatures up to 400°F.

The silicone elastomer thickness should be sufficient to permit adequate wear life in terms of abrasion resistance without excessive swelling due to contact with an offset preventing fluid such as silicone oil. Typically, about 0.3 mils to about 10 mils is satisfactory, with 4 mils being preferred.

The hardness of the silicone elastomer should be such as to allow sufficient elongation without tensile failure, typically in the range of about 10 to about 70 Shore A durometer, preferably 30 Shore A durometer. An elastomer prepared from equal parts of the aforementioned silicone gum and resin typically has a Shore A durometer value of 20–30, a tensile strength of 370 psi, percent elongation at break of 24, and a tear strength of 60 psi.

In the manufacture of the fuser blanket of this invention, the stainless steel or other suitable backing member generally must be primed with a suitable primer for fluorinated elastomers to insure an adequate bond surface for the fluorinated elastomer and to insure reliable repeatability of attained bond strength. The result desired is cohesive failure of the fluorinated elastomer layer before adhesive failure of the fluorinated elastomer-backing member interface when subjected to a conventional bond test such as a 90° or 180° peel test. Such primers are commercially available. A preferred primer when fluorosilicone elastomers are utilized is that commercially available under the tradename Dow Corning A-4040 from the Dow Corning Corporation. The primer can be applied to the substrate in a conventional manner, and can be conveniently applied from a solution of a suitable volatile solvent, such as V.M.&P. Naphtha. Recommended conditions for application are generally indicated by the manufacturer. For example, when utilizing the Dow Corning A-4040 mentioned above, the recommended application environment is 70°F. and 50 percent relative humidity. A one hour air dry under these conditions, or a 5 minute air dry followed by 5 minutes at 300°F. will effectively cure the applied primer.

With the curable fluorinated vinylidene fluoride/ fluoromonoolefin copolymers, an acceptable bond can be obtained utilizing as a primer an adhesive sold under the tradename Chemlok No. 607 by the Hugheson Chemical Co. Similarly, a primer consisting of equal parts of a 50 weight percent solution of Chemlok No. 607 is methyl alcohol and a 2 weight percent solution of Z-6020, tradename for an adhesive sold by Union Carbide Corporation, in methyl alcohol will provide a satisfactory bond.

Catalyzed fluorinated polymer can then be applied to the primed substrate by conventional means such as calendering, bulk loading, or in a preform fashion to the desired uniform thickness. The structure can then be inserted into a mold and cured at from about 200°F. to about 400°F. under a pressure of about 350 psi. Cure can be effected generally in from about 5 to about 30 minutes in this manner.

When utilizing a separate backing sheet material (as opposed to the fusing roller) as the substrate, the cured structure can be conveniently die cut to any desired configuration prior to application of the silicone elastomer overlayer.

The curable silicone overlayer composition can be applied to the cured fluorinated elastomer layer by any convenient manner, such as spraying, knife coating, brush coating, or dip coating. A preferred application method is by spraying a solution of the curable catalyzed silicone composition in a volatile solvent such as heptane, toluene, or xylene. The concentration of the silicone composition in an application solution can generally be from about 10 to about 20 weight percent when spraying is utilized, or about 50 weight percent or greater when coating is the application method utilized.

It may be advantageous to prime the cured fluorinated elastomer layer prior to application of the curable silicone composition thereto. In such cases the aforementioned Dow Corning A-4040 fluorosilicone rubber primer has been found to be an excellent primer.

The curable silicone composition overlayer and the composite blanket can then be cured and postcured at about 400°F. for from about 4 hours to about 24 hours. Postcuring of the composite structure is desired to develop high temperature stability and to maximize the physical properties of the blanket.

The toner powders to be fused to the receptor sheet utilizing the fuser blanket of this invention are generally heat fusible materials in particulate form with an average particle size of about 7 microns. A typical suitable toner powder has the following composition in percentages by weight:

| | |
|---|---|
| 44% | Epon 1004 (tradename for an epoxy resin available from the Shell Chemical Company) |
| 52% | magnetite |
| 4% | carbon black |

Another suitable developer powder consists of 65 weight percent polystyrene and 35 weight percent carbon black.

The temperature at which the fusing blanket operates may vary from about 50°C. to about 200°C. depending upon the choice of toner powder and the desired rate of fuser operation.

In order to more clearly illustrate the invention, the following nonlimiting examples are provided wherein all parts are by weight unless otherwise specified.

EXAMPLE 1

A primer solution is prepared as follows:

| | |
|---|---|
| 50 parts | Dow Corning A-4040 (tradename for a fluorosilicone rubber primer available from the Dow Corning Corp.) |
| 50 parts | V.M.&P. naphtha |

One surface of a 5 mil thick stainless steel sheet (Type 302 stainless with a number 2 finish, ¼ hard) is primed with the primer solution by brushing at about 75°F. and at a relative humidity of about 50 percent. The primer is allowed to dry for one hour at these same conditions.

A catalyzed fluorosilicone polymer is prepared by mixing on a conventional rubber mill

| | |
|---|---|
| 0.72 parts | Dicup R (tradename for dicumyl peroxide, available from the Hercules Chemical Company) |
| 100 parts | LS53 Fluorosilicone Rubber (tradename for a Dow Corning Corp. fluorosilicone) |

The catalyzed polymer is applied to the primed side of the stainless steel sheet in a preform fashion and inserted into a 290°F. conventional compression mold. The fluorosilicone polymer is cured at 350 psi for 7 minutes in the mold. The thickness of the cured fluorosilicone elastomer layer is 30 mils.

A spray solution of catalyzed silicone gum and resin is prepared by dissolving

| | |
|---|---|
| 2 parts | Dow Corning No. 184 Sylgard (tradename for a silicone encapsulating resin available from the Dow Corning Corp.) |
| 2 parts | General Electric SE 33 (tradename for dimethyl vinyl silicone gum available from the General Electric Company) |
| 1 part | Dow Corning No. 184 Catalyst (tradename for silicone encapsulating resin curing catalyst from the Dow Corning Corp.) |
| 45 parts | heptane |

The solution is applied to the cured fluorosilicone elastomer by conventional spraying in a spray booth.

The silicone composition is cured and the composite fuser blanket is postcured simultaneously for 4 hours in a 400°F. environment. The thickness of the cured silicone elastomer layer is 4 mils.

The composite fusing blanket is mounted on a fuser device as illustrated in FIG. 1 whereupon 150,000 copies (8-½ in. × 14 in.) are fixed over a 90 day period prior to the need for replacement of the composite blanket. The fuser blanket is contacted with silicone oil during the operation of the copier. The temperature of the silicone elastomer surface of the fuser blanket is typically 375°F. and the softening point of the toner is 160°F.

EXAMPLE 2

One surface of a 5 mil thick stainless steel sheet (Type 302 stainless with a number 2 finish, ¼ hard) is primed with Chemlok No. 607 (tradename for primer system, available from the Hugheson Chemical Co.) by brushing at about 75°F. and at a relative humidity of about 50 percent. The primer is allowed to dry for 30 minutes at these same conditions.

A curable fluorinated polymer composition is prepared by mixing

| | |
|---|---|
| 30 parts | Thermax MT (tradename for carbon black available from the R. T. Vanderbilt Co.) |
| 3 parts | Maglite D (tradename for magnesium oxide available from the Merck Company) |
| 6 parts | Calcium hydroxide |
| 100 parts | Fluorel 2170 (tradename for a vinylidene fluoride/perfluoropropene copolymer and available from the Minnesota Mining and Manufacturing Company) |

The catalyzed polymer composition is applied to the primed side of the stainless steel sheet in a preform fashion and inserted into a 350°F. conventional compression mold. The polymer is cured at 350 psi for 5 minutes minimum in the mold. The thickness of the cured fluroelastomer layer is 30 mils.

The cured fluoroelastomer layer is primed by brushing with a primer solution of 50 weight percent Dow Corning A-4040 in V.M.&P. naphtha at about 75°F.

and a relative humidity of about 50 percent, followed by drying for one hour at these same conditions.

After cutting the fluorinated elastomer coated stainless steel sheet to the desired size, the same curable silicone composition as in Example 1 is applied to the primed fluorinated elastomer surface in the same manner as in Example 1. The silicone composition is then cured and the composite blanket is postcured simultaneously for 24 hours in a 400°F. environment.

When utilized in an electrophotographic office copier wherein silicone oil is contacted by the fuser blanket, results similar to Example 1 are achieved.

An accelerated testing program was utilized to compare the fusing blanket of this invention with a blanket construction having a silicone elastomer bonded to a stainless sheet. This program utilized a test fusing device comprising a separate fusing module substantially as shown in FIG. 1 of the accompanying drawing. The fusing roll and the backup roll were continuously rotated while maintaining nip pressure and the fuser blanket was continuously heated from within the fusing roll. No receptor sheet was utilized and a silicone oil film was continuously maintained on the fusing blanket periphery. The blanket surface temperature was maintained at approximately 375°F.

One surface of a 5 mil thick stainless steel sheet (Type 302 with a number 2 finish, ¼ hard) is primed by brushing with Dow Corning S-2260 primer at 75°F. and 50 percent relative humidity, followed by a one hour air dry under these conditions.

A catalyzed curable silicone composition is prepared by mixing:

| | |
|---|---|
| 0.4 parts | dicumyl peroxide |
| 100 parts | GE No.24514 (a curable methyl phenyl silicone rubber available from the General Electric Co.) |

The catalyzed silicone composition is applied to the primed side of the stainless steel sheet in a preform fashion and cured in a 300°F. conventional compression mold for 8 minutes. The thickness of the cured silicone elastomer layer is 30 mils. The blanket is postcured for 4 hours at 400°F.

This blanket construction, when utilized in the accelerated testing program, has an average lifespan of 20 hours prior to delamination of the silicone elastomer from the backing.

Conversely, the lifespan of a fusing blanket prepared as per the illustrative examples averaged in excess of 348 hours under the same accelerated conditions.

What is claimed is:

1. A composite article suitable for use as a fuser blanket comprising a dimensionally-stable substrate having bonded to one surface thereof a thin, resiliently compressible layer comprising a fluorinated elastomer, and overlying said fluorinated elastomer and bonded thereto a thin, resiliently compressible layer comprising a silicone elastomer, said silicone elastomer having a release value of less than 100 grams per inch.

2. The article of claim 1 wherein said fluorinated elastomer is a fluorosilicone elastomer.

3. The article of claim 1 wherein said fluorinated elastomer is a cured linear saturated copolymer of vinylidene fluoride and at least one fluoromonoolefin.

4. The article of claim 3 wherein said fluoromonoolefin is perfluoropropene.

5. The article of claim 1 wherein said fluorinated elastomer contains at least about 37 weight percent of carbonbonded fluorine.

6. The article of claim 1 wherein said dimensionally stable substrate is comprised of a thin, flexible, metallic sheet material.

7. The article of claim 6 wherein said sheet material is stainless steel.

* * * * *